US012613581B2

(12) United States Patent
Nakamura et al.

(10) Patent No.: US 12,613,581 B2
(45) Date of Patent: Apr. 28, 2026

(54) DISPLAY CONTROL SYSTEM, DISPLAY CONTROL METHOD, AND PROGRAM

(71) Applicant: SONY INTERACTIVE ENTERTAINMENT INC., Tokyo (JP)

(72) Inventors: Kazuki Nakamura, Kanagawa (JP); Yusuke Seshita, Tokyo (JP); Nozomu Yokoyama, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 18/840,496

(22) PCT Filed: Feb. 24, 2023

(86) PCT No.: PCT/JP2023/006820
§ 371 (c)(1),
(2) Date: Aug. 22, 2024

(87) PCT Pub. No.: WO2023/171422
PCT Pub. Date: Sep. 14, 2023

(65) Prior Publication Data
US 2025/0181164 A1     Jun. 5, 2025

(30) Foreign Application Priority Data

Mar. 10, 2022     (JP) ................................. 2022-037238

(51) Int. Cl.
*G06F 3/01*          (2006.01)
*G02B 27/01*         (2006.01)
(52) U.S. Cl.
CPC ......... *G06F 3/016* (2013.01); *G02B 27/0172* (2013.01)

(58) Field of Classification Search
CPC .......... G06F 3/01; G06F 3/0481; G06F 3/016; G06F 3/165; B06B 1/04; G06N 20/00; A63F 13/285
See application file for complete search history.

(56) References Cited

U.S. PATENT DOCUMENTS 10,802,472 B2 *  10/2020  Deng .................... G05B 19/416
2001/0006376 A1 *  7/2001  Numa .................. G02B 27/017
345/7

(Continued)

FOREIGN PATENT DOCUMENTS

CN          108132707 A       6/2018
JP      WO2019043787 A1      2/2020

(Continued)

OTHER PUBLICATIONS

International Search report for corresponding International Application No. PCT/JP2023/006820, dated May 16, 2023, pp. 1-5.

(Continued)

*Primary Examiner* — Olga V Merkoulova
(74) *Attorney, Agent, or Firm* — Kilpatrick Townsend & Stockton LLP

(57) ABSTRACT

Whether or not there is a possibility that an end user using an HMD (12) has a sense of incongruity caused by vibration is analyzed. A display control system (10) includes a first acquisition section (611) configured to acquire control information for controlling, according to a video displayed on a display section (38) of the HMD (12), a vibration section (42) that causes the HMD (12) to vibrate, a second acquisition section (612) configured to acquire actual vibration information relating to actual vibration of the HMD (12), and a display control section (614) configured to cause at least the control information and the actual vibration information to be displayed together on a single screen.

20 Claims, 5 Drawing Sheets

(56) References Cited

U.S. PATENT DOCUMENTS

| | | | | |
|---|---|---|---|---|
| 2018/0173392 A1* | 6/2018 | Fujimoto | .............. | G06F 3/0485 |
| 2019/0235475 A1 | 8/2019 | Deng et al. | | |
| 2020/0334790 A1* | 10/2020 | Lee | ........................... | G06T 5/73 |
| 2021/0389822 A1* | 12/2021 | Sakamoto | ............... | A63F 13/26 |
| 2022/0187916 A1* | 6/2022 | Nakagawa | ............. | G06N 20/00 |
| 2022/0277425 A1* | 9/2022 | Ikenoue | .............. | G02B 27/646 |

FOREIGN PATENT DOCUMENTS

| | | | |
|---|---|---|---|
| JP | 2021067877 A | 4/2021 |
| WO | WO-2015137165 A1 | 9/2015 |
| WO | WO-2020090477 A1 | 5/2020 |
| WO | WO-2020158036 A1 | 8/2020 |
| WO | WO-2021048959 A1 | 3/2021 |

OTHER PUBLICATIONS

EP23766600.3, "Extended European Search Report," Jan. 27, 2026, 9 pages.

* cited by examiner

F I G . 2
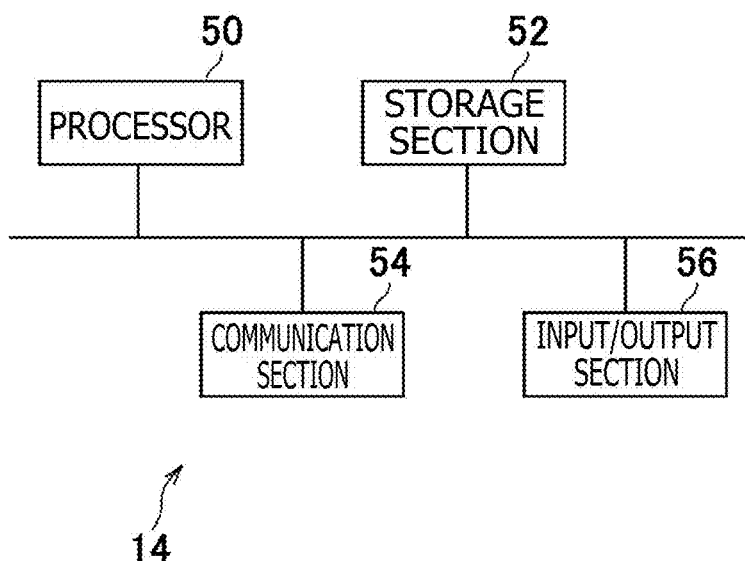
F I G . 3
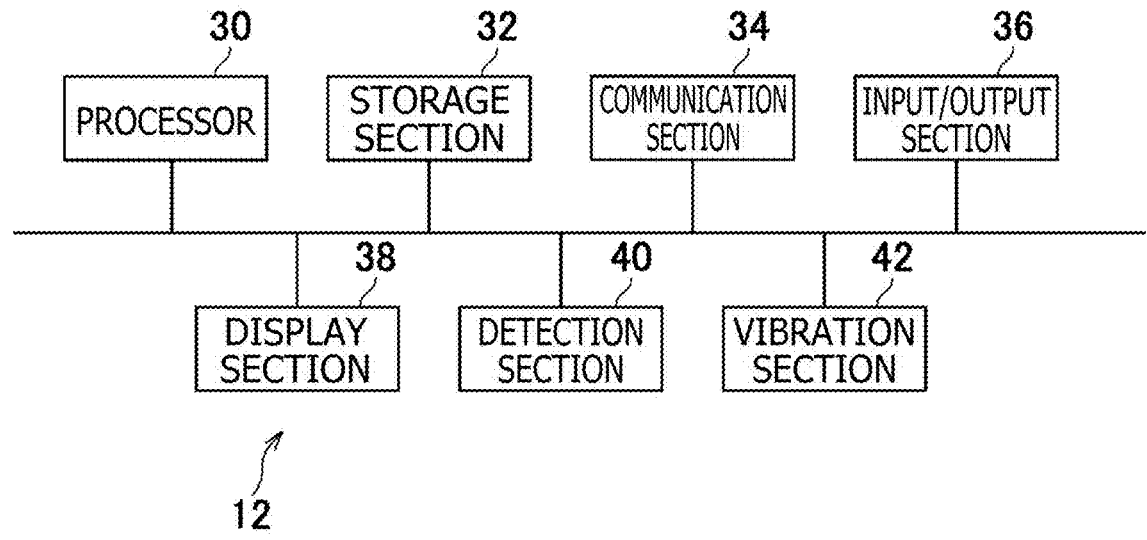

F I G . 4
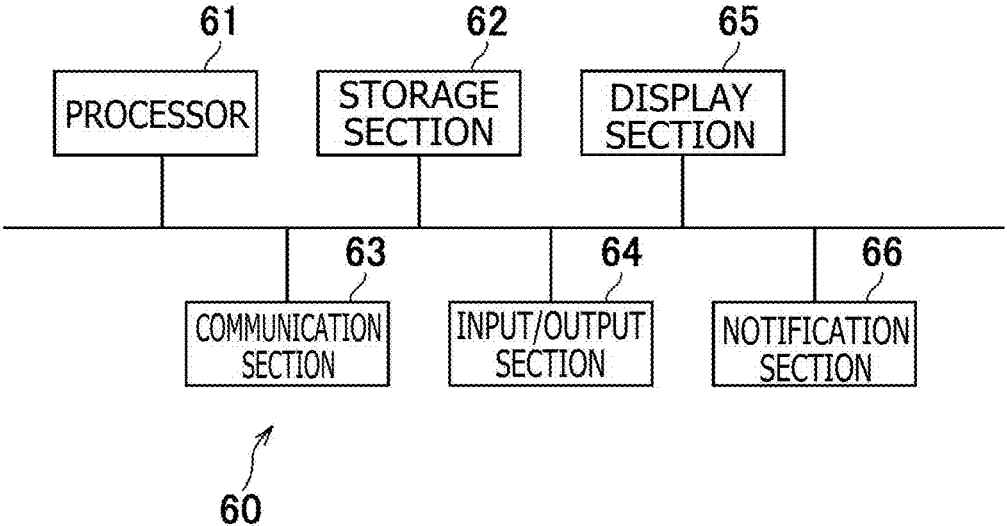
F I G . 5
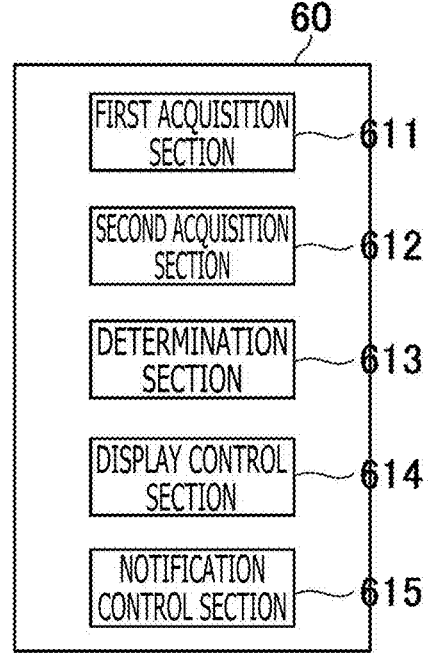

DISPLAY CONTROL SYSTEM, DISPLAY CONTROL METHOD, AND PROGRAM

CROSS REFERENCE TO RELATED APPLICATIONS

This application is a National Stage of International Application No. PCT/JP2023/006820 filed on Feb. 24, 2023, which claims priority from Japanese Patent Application 2022-037238, filed on Mar. 10, 2022. The contents of the above document is incorporated herein by reference in its entirety.

TECHNICAL FIELD

The present invention relates to a display control system, a display control method, and a program.

BACKGROUND ART

As disclosed in PTL 1, head-mounted displays that present a moving image such as a game video or a movie have been used. Using a head-mounted display enables a user to view a moving image spreading in front of the eyes of the user and to obtain high presence.

CITATION LIST

Patent Literature

[PTL 1]
PCT Patent Publication No. WO2015/137165

SUMMARY

Technical Problem

There is a demand for obtaining higher presence while using a head-mounted display. To meet this demand, for example, it is possible to use a vibration motor to generate vibration according to a video. With such a configuration, if there is a time lag between visually recognized information and a bodily sensation obtained from vibration, for example, if the vibration is delayed with respect to the video, the presence cannot be produced as expected. This causes an end user to have a sense of incongruity.

The present invention has been devised in view of the circumstances described above, and one of objects of the present invention is to analyze whether or not there is a possibility that an end user using a head-mounted display has a sense of incongruity caused by vibration.

Solution to Problem

In order to solve the above problem, according to the present invention, there is provided a display control system including a first acquisition section configured to acquire control information for controlling, according to a video displayed on a display section of a head-mounted display, a vibration section that causes the head-mounted display to vibrate, a second acquisition section configured to acquire actual vibration information relating to actual vibration of the head-mounted display, and a display control section configured to cause at least the control information and the actual vibration information to be displayed together on a single screen.

Further, according to the present invention, there is provided a display control method including a procedure of acquiring control information for controlling, according to a video displayed on a display section of a head-mounted display, a vibration section that causes the head-mounted display to vibrate, a procedure of acquiring actual vibration information relating to actual vibration of the head-mounted display, and a procedure of causing at least the control information and the actual vibration information to be displayed together on a single screen.

Further, according to the present invention, there is provided a program for causing a computer to execute a procedure of acquiring control information for controlling, according to a video displayed on a display section of a head-mounted display, a vibration section that causes the head-mounted display to vibrate, a procedure of acquiring actual vibration information relating to actual vibration of the head-mounted display, and a procedure of causing at least the control information and the actual vibration information to be displayed together on a single screen.

BRIEF DESCRIPTION OF DRAWINGS

FIG. 2 is a diagram illustrating an example of a configuration of an entertainment apparatus according to the present embodiment.

FIG. 3 is a diagram illustrating an example of a configuration of a head-mounted display according to the present embodiment.

FIG. 4 is a diagram illustrating an example of a configuration of an analysis apparatus according to the present embodiment.

FIG. 5 is a functional block diagram illustrating an example of functions implemented in the analysis apparatus according to the present embodiment.

DESCRIPTION OF EMBODIMENT

An embodiment of the present invention (hereinafter referred to as the present embodiment) will be described below with reference to the drawings.

[Outline of Entire Configuration of Display Control System 10]

Figure 1:
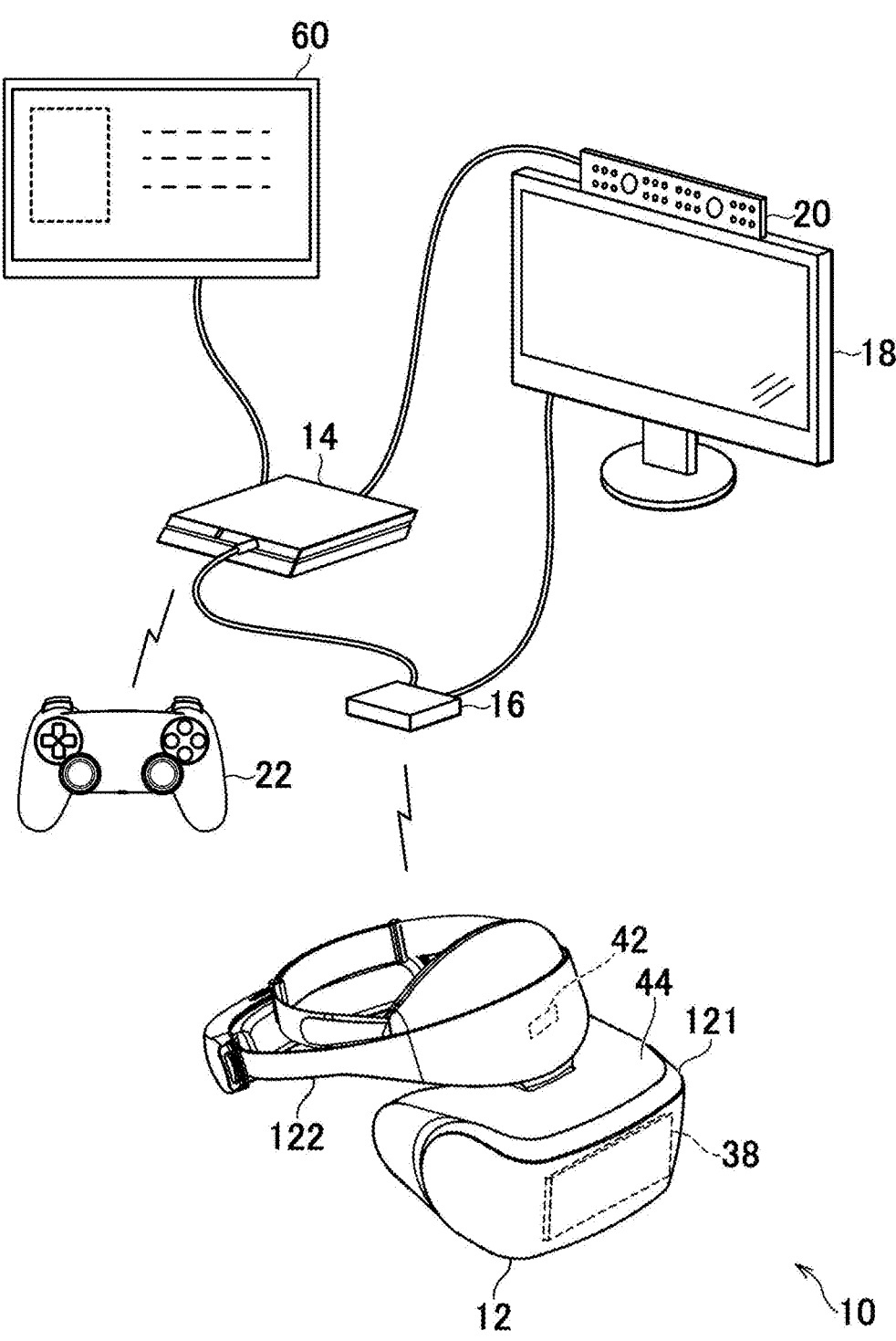
FIG. 1 is a diagram illustrating an example of an entire configuration of a display control system according to the present embodiment.

FIG. 1 is a diagram illustrating an example of an entire configuration of a display control system according to the present embodiment. As illustrated in FIG. 1, a display control system 10 according to the present embodiment preferably includes, for example, a head-mounted display (hereinafter referred to also as an HMD) 12, an entertainment apparatus 14, a relay apparatus 16, a television 18, a camera/microphone unit 20, a controller 22, and an analysis apparatus 60. It is to be noted that the entire configuration of the display control system 10 illustrated in FIG. 1 is merely an example and not restrictive. For example, the television 18, the camera/microphone unit 20, and the relay apparatus 16 may not be included.

The analysis apparatus 60 is a computer (information processing apparatus) used by a person (hereinafter referred to as an analyzer) who analyzes a vibration state of the HMD 12 provided with a vibration function before the HMD 12 is provided to an end user. By the analyzer analyzing the vibration state of the HMD 12 with use of the analysis apparatus 60, it is made possible to provide the end user with the HMD 12 that realizes comfortable vibration. For example, it is preferable that a developer of the HMD 12 adjust the level and timing of vibration according to the vibration state analyzed by the analyzer, before the HMD 12 is provided to the end user. It is to be noted that the end user is preferably a consumer who purchases and uses the HMD 12.

[Configuration of Entertainment Apparatus 14]

FIG. 2 is a diagram illustrating an example of a configuration of the entertainment apparatus according to the present embodiment. As illustrated in FIG. 2, for example, the entertainment apparatus 14 according to the present embodiment preferably includes a processor 50, a storage section 52, a communication section 54, and an input/output section 56.

The entertainment apparatus 14 preferably is, for example, a computer such as a game console, a digital versatile disc (DVD) player, or a Blu-ray (registered trademark) player. The entertainment apparatus 14 according to the present embodiment preferably generates a video and sound by, for example, executing a game program or reproducing content which program and content are stored therein or recorded in an optical disk. Then, the entertainment apparatus 14 according to the present embodiment preferably outputs a video signal representing the generated video and an audio signal representing the generated sound to the television 18, the HMD 12, and the analysis apparatus 60 via the relay apparatus 16.

The processor 50 preferably is, for example, a program control device such as a central processing unit (CPU) that operates in accordance with a program installed in the entertainment apparatus 14.

The storage section 52 preferably is, for example, a storage element such as a read-only memory (ROM) or a random access memory (RAM), a hard disk drive, or the like. The storage section 52 preferably stores therein the program to be executed by the processor 50 and the like. The communication section 54 preferably is, for example, a communication interface such as a wireless local area network (LAN) module. The input/output section 56 preferably is an input/output port such as a high-definition multimedia interface (registered trademark) (HDMI) port or a universal serial bus (USB) port.

It is to be noted that the components provided in the entertainment apparatus 14 may be incorporated in the HMD 12.

[Configuration of HMD 12]

As illustrated in FIG. 1, the HMD 12 preferably includes a main body 121 and a fastening band 122. The fastening band 122 preferably is, as a whole, in an annular shape to surround the head of the user. The main body 121 preferably includes a housing 44 that accommodates a display section 38 and the like and that forms an exterior of the main body 121. The fastening band 122 preferably is connected to an upper portion of the main body 121.

FIG. 3 is a diagram illustrating an example of a configuration of the head-mounted display according to the present embodiment. As illustrated in FIG. 3, the HMD 12 preferably includes a processor 30, a storage section 32, a communication section 34, an input/output section 36, the display section 38, a detection section 40, and a vibration section 42.

The processor 30 preferably is, for example, a program control device such as a microprocessor that operates in accordance with a program installed in the HMD 12. The storage section 32 preferably is, for example, a storage element such as a ROM or a RAM. The storage section 32 preferably stores therein the program to be executed by the processor 30 and the like. The communication section 34 preferably is, for example, a communication interface such as a wireless LAN module. It is to be noted that, while the HMD 12 in the example illustrated in FIG. 1 is capable of communication with the entertainment apparatus 14 by wireless communication, the HMD 12 may have a configuration capable of wired communication. The input/output section 36 preferably is, for example, an input/output port such as an HDMI (registered trademark) port or a USB port.

The display section 38 is, for example, a display such as a liquid crystal display or an organic electroluminescent (EL) display and preferably causes the video generated by the entertainment apparatus 14 and the like to be displayed thereon. The display section 38 preferably is disposed in front of the eyes of the user in the state in which the user wears the HMD 12. The display section 38 preferably receives the video signal output by the entertainment apparatus 14 and relayed by the relay apparatus 16, for example, and outputs the video represented by this video signal.

The display section 38 preferably is, for example, capable of displaying a three-dimensional image by displaying an image for the left eye and an image for the right eye. It is to be noted that the display section 38 is not limited to the one that displays a three-dimensional image, and may be one that is only capable of displaying a two-dimensional image.

The detection section 40 preferably is a sensor having a function of detecting a posture of the HMD 12. For example, the detection section 40 preferably is an inertial measurement unit (IMU) including a gyro sensor and an acceleration sensor. The detection section 40 preferably outputs a detection result to the processor 30. In addition, the processor 30 preferably calculates a vibration frequency (hereinafter referred to as a detected vibration frequency) estimated from the detection result supplied from the detection section 40. It is to be noted that the detected vibration frequency preferably is a vibration frequency of the HMD 12 estimated from an angular velocity, acceleration, or the like detected by the detection section 40. It is to be noted that the detection section 40 is not limited to the IMU and may be a sensor capable of detecting an actual rotational frequency of a motor provided in the vibration section 42. In this case, the processor 30 preferably calculates the detected vibration frequency of the HMD 12 on the basis of the detected actual rotational frequency of the motor.

The vibration section 42 preferably is, for example, a vibration device constituting what is generally called an eccentric motor. The vibration section 42 is driven (vibrates) in accordance with an instruction received from the entertainment apparatus 14. As illustrated in FIG. 1, for example, the vibration section 42 preferably is disposed in a front portion of the fastening band 122. It is to be noted that FIG. 1 illustrates arrangement of the vibration section 42 and also schematically illustrates the shape of the vibration section 42. The vibration section 42 is only required to be provided in the HMD 12 to cause the HMD 12 to vibrate, and is not limited to the arrangement illustrated in FIG. 1.

The vibration section 42 preferably vibrates, for example, when an object or a game character operated by the user makes some action or receives an impact. Along with the vibration of the vibration section 42, the fastening band 122 vibrates, and this vibration is transmitted to the head of the user. Accordingly, the user can have an experience with high presence.

[Configuration of Analysis Apparatus 60]

FIG. 4 is a diagram illustrating an example of a configuration of the analysis apparatus according to the present embodiment. As illustrated in FIG. 4, the analysis apparatus 60 preferably includes a processor 61, a storage section 62, a communication section 63, an input/output section 64, a display section 65, and a notification section 66.

The processor 61 preferably is, for example, a program control device such as a microprocessor that operates in accordance with a program installed in the analysis apparatus 60. The storage section 62 preferably is, for example, a storage element such as a ROM or a RAM. The storage section 62 preferably stores therein the program to be executed by the processor 61 and the like. The communication section 63 preferably is, for example, a communication interface such as a wireless LAN module. The input/output section 64 preferably is, for example, an input/output port such as an HDMI (registered trademark) port or a USB port.

The display section 65 preferably is, for example, a display such as a liquid crystal display or an organic EL display. The notification section 66 preferably is, for example, a loudspeaker for notifying the analyzer of the vibration state of the HMD 12 by sound or the like.

The hardware configuration of each computer described above is not limited to the above examples, and various kinds of hardware can be applied. For example, a reading section (an optical disk drive or a memory card slot, for example) for reading a computer-readable information storage medium may be included. For example, a program and data stored in the information storage medium may be supplied to the computer via the reading section or the input/output section.

[Functions of Analysis Apparatus 60]

FIG. 5 is a functional block diagram illustrating an example of functions implemented in the analysis apparatus according to the present embodiment. As illustrated in FIG. 5, the analysis apparatus 60 preferably includes a first acquisition section 611, a second acquisition section 612, a determination section 613, a display control section 614, and a notification control section 615. These functions preferably are implemented mainly by the processor 61.

The first acquisition section 611 acquires control information for controlling the driving of the vibration section 42. The control information preferably is, for example, a video signal generated by the entertainment apparatus 14 or a driving signal for controlling a driving force to be supplied to a coil in the vibration section 42 according to the video signal. In the example described in the present embodiment, the control information is a driving signal.

The second acquisition section 612 acquires actual vibration information relating to the actual vibration of the HMD 12. The actual vibration information preferably is a detection value detected by the detection section 40 or information based on the detection value. More specifically, the actual vibration information preferably includes the detected vibration frequency of the HMD 12. The actual vibration information further preferably includes the acceleration, angular velocity, and the like of the HMD 12.

The determination section 613 determines whether or not the vibration of the HMD 12 is comfortable for the end user, on the basis of one of or both the control information acquired by the first acquisition section 611 and the actual vibration information acquired by the second acquisition section 612. For example, the determination section 613 preferably determines whether or not the vibration of the HMD 12 is comfortable, on the basis of a frequency of the driving signal supplied to the vibration section 42 and a period of time during which the first acquisition section 611 continuously acquires this driving signal. Alternatively, for example, the determination section 613 preferably determines whether or not the vibration of the HMD 12 is comfortable, on the basis of the detected vibration frequency of the HMD 12 and a period of time during which the first acquisition section 612 continuously acquires this detected vibration frequency. In a case where the detected vibration frequency of the HMD 12 is high and the period of time during which the detected vibration frequency is continuously acquired is long, for example, the determination section 613 preferably determines that the vibration is uncomfortable. This is because the end user may feel uncomfortable when large vibration continues for a long period of time.

In addition, for example, the determination section 613 may determine whether or not the vibration is generated as intended by the developer, by comparing the control information and the actual vibration information with each other. More specifically, the determination section 613 may determine whether or not the detected vibration frequency deviates from the frequency of the driving signal supplied to the vibration section 42.

The display control section 614 causes a screen of the display section 65 to display at least the control information acquired by the first acquisition section 611 and the actual vibration information acquired by the second acquisition section 612 together. Further, the of the display section 65 to display the determination result by the determination section 613 together with the control information and the actual vibration information.

The display control section 614 preferably causes the screen of the display section 65 to display the determination result, for example, when a predetermined period of time set in advance for each vibration frequency has passed. By checking the displayed determination result, the analyzer can recognize that the vibration is generated in excess of an allowable range within which the end user feels comfortable.

More specifically, for example, the display control section 614 preferably causes the screen of the display section 65 to display a determination result of "Frequency Range 1" when a driving signal having a vibration frequency of 20 to 25 [Hz] is supplied continuously for 1.5 seconds. Further, for example, the display control section 614 preferably causes the screen of the display section 65 to display a determination result of "Frequency Range 2" when a driving signal having a vibration frequency of 16 to 19 [Hz] is supplied continuously for 10 seconds. Further, for example, the of the display section 65 to display a determination result of "Frequency Range 3" when a driving signal having a vibration frequency of 15 [Hz] or lower is supplied continuously for 60 seconds. These determination results indicate that the end user may possibly feel uncomfortable in the respective frequency bands. In the case of observing "Frequency Range 3" displayed on the screen of the display section 65, for example, the analyzer can recognize that such a video that a driving signal having a vibration frequency of 15 [Hz] or lower is supplied continuously for a long period of time is displayed on the display section 38 of the HMD 12. It is to be noted that details of a display state on the display section 65 will be described later with reference to FIG. 6. In addition, numerical values of the vibration frequency mentioned here and the displayed determination results are merely examples and not restrictive.

It is to be noted that the display control section 614 is not limited to the one that causes the determination result to be displayed only when the determination section 613 determines that the vibration is uncomfortable, and may be one that causes the determination result to be displayed during a period during which the determination by the determination section 613 indicates that the vibration is not uncomfortable (the vibration is comfortable).

Moreover, the display control section 614 may cause the display section 38 of the HMD 12, as well as the display section 65, to display a screen image including information similar to that of a screen image described later with reference to FIG. 6. The analyzer himself/herself wears the HMD 12 to check the vibration state in some cases. However, since wearing the HMD 12 blocks a view of the surroundings, the analyzer cannot visually recognize the display section 65 of the analysis apparatus 60. To cope with this problem, display is preformed on the display section 38 provided in the HMD 12, so that the analyzer wearing the HMD 12 can be notified of the determination result.

The notification control section 615 preferably notifies a wearer wearing the HMD 12 of the determination result by the determination section 613, by use of the notification section 66. The analyzer himself/herself wears the HMD 12 to check the vibration state in some cases. However, since wearing the HMD 12 blocks the view of the surroundings, the analyzer cannot visually recognize the display section 65 of the analysis apparatus 60. To cope with this problem, sound is issued for notification of the determination result, so that the analyzer wearing the HMD 12 can be notified of the determination result. It is to be noted that the notification of the determination result may not only be performed by the notification section 65 of the analysis apparatus 60, but also be performed by a loudspeaker provided in a device other than the analysis apparatus 60.

All or some of the above-described functions provided in the analysis apparatus 60 according to the present embodiment may be implemented by another computer.

[Example of Screen Image]

Figure 6:
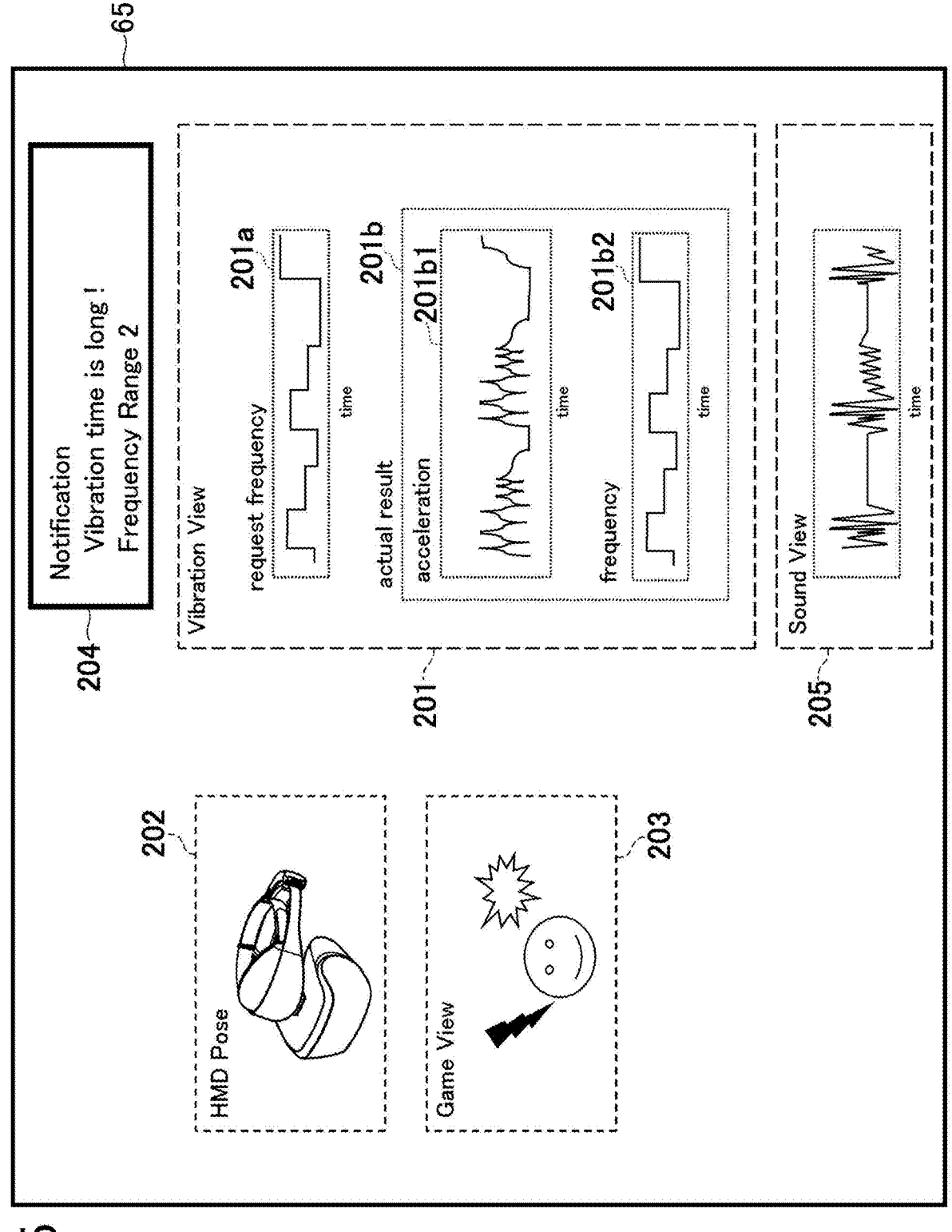
FIG. 6 is a diagram illustrating an example of a screen image displayed on a display section of the analysis apparatus according to the present embodiment.

FIG. 6 is a diagram illustrating an example of the screen image displayed on the display section of the analysis apparatus according to the present embodiment. In the example illustrated in FIG. 6, the display control section 614 displays vibration information 201 indicated as "Vibration View," HMD posture information 202 indicated as "HMD Pose," game screen image information 203 indicated as "Game View," determination result information 204 indicated as "Notification," and sound information 205 indicated as "Sound View" together on the display section 65.

In the example illustrated in FIG. 6, the vibration information 201 includes driving signal information 201a that is control information indicated as "request frequency" and actual vibration information 201b indicated as "actual result."

The driving signal information 201a in FIG. 6 is illustrated as a waveform graph with the time set on the axis of abscissa and the vibration frequency set on the axis of ordinate.

Further, in the example illustrated in FIG. 6, the actual vibration information 201b includes acceleration information 201b1 indicated as a waveform graph with the time set on the axis of abscissa and the acceleration of the vibration section 42 set on the axis of ordinate and detected vibration frequency information 201b2 indicated as a waveform graph with the time set on the axis of abscissa and the detected vibration frequency set on the axis of ordinate. It is to be noted that the actual vibration information 201b is only required to be information detected by the detection section 40 and may include angular velocity information or the like of the HMD 12, for example.

In addition, as illustrated in FIG. 6, the time axis for the driving signal information 201a and the time axis for the actual vibration information 201b preferably are displayed side by side on the same scale. Further, the driving signal information 201a and the actual vibration information 201b preferably are displayed simultaneously on the screen of the display section 65. This enables the analyzer to comparatively check the driving signal supplied to the vibration section 42 and the information relating to the actual vibration of the vibration section 42 at each timing by viewing the display section 65. Thus, the analyzer can check whether or not the vibration is delayed with respect to the video.

The HMD posture information 202 preferably is a video including how the HMD 12 externally appears when the second acquisition section 612 acquires the actual vibration information. The HMD posture information 202 preferably is displayed on the basis of an output from an imaging device such as a camera that photographs, during the analysis, the wearer wearing the HMD 12. It is to be noted that the HMD posture information 202 is not limited to a photographed video and may be displayed using computer graphics (CG).

The game screen image information 203 preferably represents a video at the time when the second acquisition section 612 acquires the actual vibration information. More specifically, the game screen image information 203 preferably is a game screen image displayed on the television 18 when the second acquisition section 612 acquires the actual vibration information.

In the present embodiment, the HMD posture information 202 and the game screen image information 203 are displayed together with the vibration information 201. This enables the analyzer to check the posture of the HMD 12, the video of the game screen image, and the vibration state of the HMD 12 simultaneously.

Moreover, in the present embodiment, the display control section 614 causes the determination result information 204 based on the determination result by the determination section 613 to be displayed on the screen of the display section 65. In the example illustrated in FIG. 6, the determination result display information 204 indicated as "Notification" is displayed on the screen of the display section 65. More specifically, in the example illustrated in FIG. 6, the determination result is "Frequency Range 2" described above. Such a display enables the analyzer to recognize in what kind of posture the HMD 12 is and what kind of situation is displayed in the video of the game screen image when there is a possibility that the end user feels uncomfortable.

It is to be noted that the determination result information 204 does not need to be displayed all the time, and may be displayed only when there is the possibility that the end user feels uncomfortable. Further, the determination result information 204 may be displayed as emphasized characters, for example, bold or colored characters. This makes it easier for the analyzer to visually recognize the possibility that the end user feels uncomfortable.

In addition, in the example illustrated in FIG. 6, the sound information 205 indicated as a waveform graph with the time set on the axis of abscissa and the volume of sound set on the axis of ordinate is displayed on the screen of the display section 65. The time axis for the sound information 205 and the time axis for the vibration information 201 preferably are displayed side by side on the same scale. This enables the analyzer to comparatively check the driving signal supplied to the vibration section 42, the state of the actual vibration of the vibration section 42, and the sound output according to the video displayed on the display section 38 of the HMD 12, at each timing by viewing the display section 65. For example, the analyzer can check if the vibration of the HMD 12 is delayed or earlier with respect to the sound output according to the video.

The screen image illustrated in FIG. 6 is merely an example, and a screen image including other unillustrated information may be displayed. The arrangement of the respective pieces of information is also not limited to the example illustrated in FIG. 6, and it may be possible to adjust the arrangement as appropriate in an easy-to-see manner for the analyzer. Furthermore, the screen image illustrated in FIG. 6 may be displayed not only on the screen of the display section 65 of the analysis apparatus 60 but also on the television 18 or the screen of the display section 38 of the HMD 12.

[Flow Chart]

Figure 7:
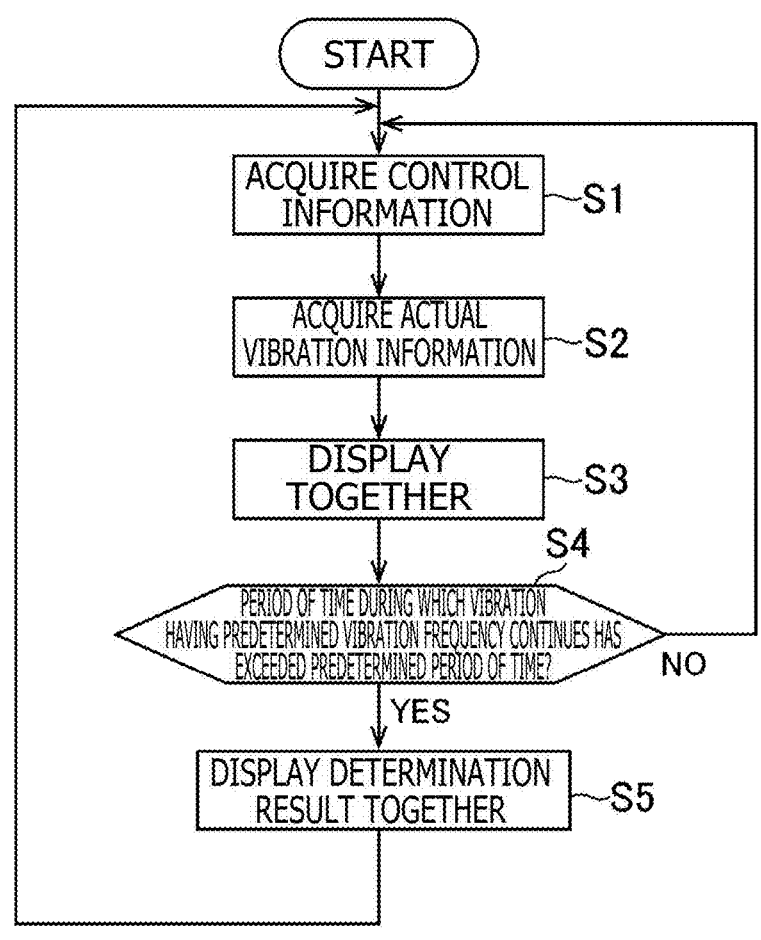
FIG. 7 is a flow chart illustrating an example of processing executed in the analysis apparatus according to the present embodiment.

Description will now be made of an example of a flow of processing executed in the analysis apparatus 60 according to the present embodiment with reference to a flow chart illustrated in FIG. 7. FIG. 7 is a flow chart illustrating an example of processing executed in the analysis apparatus according to the present embodiment.

First, the first acquisition section 611 acquires the control information (step S1). Next, the second acquisition section 612 acquires the actual vibration information (step S2). Thereafter, the display control section 614 causes the control information and the actual vibration information to be displayed together on the screen of the display section 65 and the like (step S3).

Further, the determination section 613 determines whether or not a period of time during which vibration having a predetermined vibration frequency continues has exceeded a predetermined period of time (step S4). When the determination section 613 determines that the period of time during which the vibration having the predetermined vibration frequency continues has exceeded the predetermined period of time (YES in step S4), the display control section 614 causes the determination result to be displayed together with the control information and the actual vibration information on the screen of the display section 65 and the like (step S5).

For example, the display control section 614 preferably causes the determination result to be continuously displayed for approximately several seconds (10 seconds, for example) and then stops the display of the determination result. With the display of the determination result continued for a certain period of time and then stopped, it is easy for the analyzer to visually recognize what kind of situation is displayed in the video when the vibration of the HMD 12 causes discomfort.

The invention claimed is:

1. A display control system comprising:
a memory comprising computer-executable instructions; and
a processor configured to access the memory and execute the computer-executable instructions to perform operations comprising:
acquiring, by the display control system from an entertainment apparatus, control information provided to a head-mounted display, wherein the control information controls a vibration section that causes the head-mounted display to vibrate according to a first vibration information;
acquiring, by the display control system, second vibration information relating to vibration detected by a vibration detector of the head-mounted display from the head-mounted display vibrating based on the first vibration information; and
causing, by the display control system, the first vibration information and the second vibration information to be displayed together on a display device.

2. The display control system according to claim 1, wherein the memory comprises additional computer-executable instructions and the processor is further configured to access the memory and execute the additional computer-executable instructions to perform additional operations comprising:
generating, by the display control system, a determination result of whether the vibration of the head-mounted display causes discomfort based on at least either the first vibration information or the second vibration information; and
causing, by the display control system, the determination result to be displayed together with the first vibration information and the second vibration information on the display device.

3. The display control system according to claim 2, wherein, when a period of time during which the first vibration information or the second vibration information is continuously acquired has exceeded a predetermined period of time, the determination result indicates that the vibration of the head-mounted display causes discomfort.

4. The display control system according to claim 3, wherein the predetermined period of time is set in advance for each vibration frequency associated with at least one of the first vibration information or the second vibration information.

5. The display control system according to claim 1, wherein:
the first vibration information is displayed on the display device as a first waveform graph with time set on a first axis of abscissa and a vibration frequency set on a first axis of ordinate;
the second vibration information is displayed on the display device as a second waveform graph with the time set on a second axis of abscissa and the vibration frequency set on a second axis of ordinate; and
the first axis of abscissa for the first vibration information and the second axis of abscissa for the second vibration information are displayed side by side on a same scale.

6. The display control system according to claim 2, wherein the memory comprises additional computer-executable instructions and the processor is further configured to access the memory and execute the additional computer-executable instructions to perform additional operations comprising: notifying, by the display control system, a wearer wearing the head-mounted display of the determination result by sound.

7. The display control system according to claim 1, wherein a screen of a display section of the head-mounted display includes the display device.

8. The display control system according to claim 1, wherein at least either a first screen of a display section provided in an information processing apparatus is connected to the head-mounted display in a communicable manner includes the display device or a second screen of a television is connected to the head-mounted display in a communicable manner includes the display device.

9. The display control system according to claim 1, wherein the memory comprises additional computer-executable instructions and the processor is further configured to access the memory and execute the additional computer-executable instructions to perform additional operations comprising causing a video to be displayed together with the first vibration information and the second vibration information on the display device, wherein the video depicts how the head-mounted display externally appears when the display control system acquires the second vibration information.

10. A computer-implemented method comprising:
    acquiring, by an electronic device from an entertainment apparatus, control information provided to a head-mounted display, wherein the control information controls a vibration section that causes the head-mounted display to vibrate according to a first vibration information;
    acquiring, by the electronic device, a second vibration information relating to vibration detected by a vibration detector of the head-mounted display from the head-mounted display vibrating based on the first vibration information; and
    causing, by the electronic device, the first vibration information and the second vibration information to be displayed together on a display device.

11. One or more non-transitory computer-readable media comprising computer-executable instructions that, when executed by one or more processors of an electronic device, cause the electronic device to perform operations comprising:
    acquiring, by the electronic device from an entertainment apparatus, control information provided to a head-mounted display, wherein the control information controls a vibration section that causes the head-mounted display to vibrate according to a first vibration information;
    acquiring, by the electronic device, a second vibration information relating to vibration detected by a vibration detector of the head-mounted display from the head-mounted display vibrating based on the first vibration information; and
    causing, by the electronic device, first vibration information and the second vibration information to be displayed together on a display device.

12. The computer-implemented method according to claim 10, further comprising:
    generating, by the electronic device, a determination result of whether the vibration of the head-mounted display causes discomfort based on at least the first vibration information or the second vibration information; and
    causing, by the electronic device, the determination result to be displayed together with the first vibration information and the second vibration information on the display device.

13. The computer-implemented method according to claim 12, wherein, when a period of time during which the first vibration information or the second vibration information is continuously acquired has exceeded a predetermined period of time, the determination result indicates that the vibration of the head-mounted display causes discomfort.

14. The computer-implemented method according to claim 12, further comprising notifying, by the electronic device, a wearer wearing the head-mounted display of the determination result by sound.

15. The computer-implemented method according to claim 12, wherein:
    the first vibration information is displayed on the display device as a first waveform graph with time set on a first axis of abscissa and a vibration frequency set on a first axis of ordinate;
    the second vibration information is displayed on the display device as a second waveform graph with the time set on a second axis of abscissa and the vibration frequency set on a second axis of ordinate; and
    the first axis of abscissa for the first vibration information and the second axis of abscissa for the second vibration information are displayed side by side on a same scale.

16. The computer-implemented method according to claim 10, wherein a screen of a display section of the head-mounted display includes the display device.

17. The one or more non-transitory computer-readable media according to claim 11, further comprising additional computer-executable instructions that, when executed by the one or more processors, cause the electronic device to perform additional operations comprising:
    generating, by the electronic device, a determination result of whether the vibration of the head-mounted display causes discomfort based on at least the first vibration information or the second vibration information; and
    causing, by the electronic device, the determination result to be displayed together with the first vibration information and the second vibration information on the display device.

18. The one or more non-transitory computer-readable media according to claim 17, wherein, when a period of time during which the first vibration information or the second vibration information is continuously acquired has exceeded a predetermined period of time, the determination result indicates that the vibration of the head-mounted display causes discomfort.

19. The one or more non-transitory computer-readable media according to claim 17, further comprising additional computer-executable instructions that, when executed by the one or more processors, cause the electronic device to perform additional operations comprising notifying, by the electronic device, a wearer wearing the head-mounted display of the determination result by sound.

20. The one or more non-transitory computer-readable media according to claim 11, wherein:
    the first vibration information is displayed on the display device as a first waveform graph with time set on a first axis of abscissa and a vibration frequency set on a first axis of ordinate;
    the second vibration information is displayed on the display device as a second waveform graph with the time set on a second axis of abscissa and the vibration frequency set on a second axis of ordinate; and
    the first axis of abscissa for the first vibration information and the second axis of abscissa for the second vibration information are displayed side by side on a same scale.

* * * * *